(12) United States Patent
Propheter-Hinckley et al.

(10) Patent No.: US 9,175,570 B2
(45) Date of Patent: Nov. 3, 2015

(54) AIRFOIL INCLUDING MEMBER CONNECTED BY ARTICULATED JOINT

(75) Inventors: Tracy A. Propheter-Hinckley, Manchester, CT (US); Anita L. Tracy, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 777 days.

(21) Appl. No.: 13/454,204

(22) Filed: Apr. 24, 2012

(65) Prior Publication Data
US 2013/0276456 A1  Oct. 24, 2013

(51) Int. Cl.
*F01D 5/22* (2006.01)
*F01D 5/26* (2006.01)

(52) U.S. Cl.
CPC .. *F01D 5/22* (2013.01); *F01D 5/26* (2013.01); *Y10T 29/49316* (2015.01)

(58) Field of Classification Search
CPC .............. F01D 5/26; F01D 5/22; F01D 25/06
USPC ....................... 416/145, 193 A, 248, 500, 190
See application file for complete search history.

(56) References Cited

U.S. PATENT DOCUMENTS

| | | | |
|---|---|---|---|
| 2,343,918 A | 5/1943 | McCoy | |
| 4,815,939 A | 3/1989 | Doble | |
| 4,854,821 A | 8/1989 | Kernon et al. | |
| 5,038,014 A | 8/1991 | Pratt et al. | |
| 5,165,860 A | 11/1992 | Stoner et al. | |
| 5,558,497 A | 9/1996 | Kraft et al. | |
| 5,749,705 A | 5/1998 | Clarke et al. | |
| 5,837,960 A | 11/1998 | Lewis et al. | |
| 6,391,251 B1 | 5/2002 | Keicher et al. | |
| 6,669,447 B2 | 12/2003 | Norris et al. | |
| 7,112,044 B2 | 9/2006 | Whitehead et al. | |
| 7,121,800 B2 | 10/2006 | Beattie | |
| 7,121,801 B2 | 10/2006 | Surace et al. | |
| 7,125,225 B2 | 10/2006 | Surace et al. | |
| 7,217,093 B2 | 5/2007 | Propheter et al. | |
| 7,270,517 B2 | 9/2007 | Garner | |
| 7,478,994 B2 | 1/2009 | Cunha et al. | |
| 7,857,588 B2 | 12/2010 | Propheter-Hinckley et al. | |
| 2005/0079062 A1 | 4/2005 | Surace et al. | |
| 2005/0232777 A1* | 10/2005 | Gautreau et al. | 416/219 R |
| 2008/0290215 A1 | 11/2008 | Udall et al. | |
| 2009/0258168 A1 | 10/2009 | Barcock | |
| 2010/0028135 A1 | 2/2010 | Hunt et al. | |
| 2011/0048664 A1 | 3/2011 | Kush et al. | |

OTHER PUBLICATIONS

International Search Report and Written Opinion for International Application No. PCT/US2013/036103 completed on Jul. 24, 2013.

* cited by examiner

*Primary Examiner* — Edward Look
*Assistant Examiner* — Jason Mikus
(74) *Attorney, Agent, or Firm* — Carlson, Gaskey & Olds, P.C.

(57) ABSTRACT

An airfoil includes a body that has a platform, an airfoil extending outwardly from a side of the platform and a root extending outwardly from another side of the platform. A member is connected in an articulated joint to the body.

21 Claims, 8 Drawing Sheets

AIRFOIL INCLUDING MEMBER CONNECTED BY ARTICULATED JOINT

BACKGROUND

This disclosure relates to an airfoil, such as an airfoil for a gas turbine engine.

Turbine, fan and compressor airfoil structures are typically manufactured using die casting techniques. For example, the airfoil is cast within a mold that defines an exterior airfoil surface. A core structure may be used within the mold to form impingement holes, cooling passages, ribs or other structures within the airfoil. The die casting technique inherently limits the geometry, size, wall thickness and location of airfoil structures. Thus, the design of a traditional airfoil is limited to structures that can be manufactured using the die casting technique, which in turn may limit the performance of the airfoil.

SUMMARY

An airfoil according to an exemplary aspect of the present disclosure includes a body that has a platform, an airfoil extending outwardly from a side of the platform and a root extending outwardly from another side of the platform. A member is connected in an articulated joint to the body.

In a further non-limiting embodiment of the above example, the member includes a body extending adjacent the platform.

In a further non-limiting embodiment of any of the foregoing examples, the articulated joint includes a socket and a socket member movably interlocked with the socket.

In a further non-limiting embodiment of any of the foregoing examples, the socket is fixed on the root.

In a further non-limiting embodiment of any of the foregoing examples, the body defines a longitudinal axis and the socket is longitudinally elongated relative to the longitudinal axis.

In a further non-limiting embodiment of any of the foregoing examples, the body defines a longitudinal axis and the socket member is longitudinally elongated relative to the longitudinal axis.

In a further non-limiting embodiment of any of the foregoing examples, the member is a damper member including a damper body extending adjacent the platform, and the socket includes socket sidewalls that define an opening through which the damper body of the damper member extends.

In a further non-limiting embodiment of any of the foregoing examples, the opening is smaller than the socket member such that the socket member cannot fit through the opening.

In a further non-limiting embodiment of any of the foregoing examples, the articulated joint includes an open gap between the socket and the socket member.

In a further non-limiting embodiment of any of the foregoing examples, the socket member is irremovably interlocked with the socket such that the socket member cannot be removed from the socket non-destructively.

In a further non-limiting embodiment of any of the foregoing examples, the socket is a slot and the socket member is a button having a shank and enlarged head on the shank.

In a further non-limiting embodiment of any of the foregoing examples, the member is a damper member including a damper body extending adjacent the platform, and the body defines a longitudinal axis and the damper body of the damper member includes an inclined bearing surface relative to the longitudinal axis.

A further non-limiting embodiment of any of the foregoing examples includes a first buttress wall extending outwardly from the platform to the root and a second buttress wall extending outwardly from the platform to the root, the first buttress wall being spaced apart from the second buttress wall and the member being connected in a first articulated joint to the first buttress wall and in a second articulated joint to the second buttress wall.

In a further non-limiting embodiment of any of the foregoing examples, the member includes a body extending adjacent the platform, the body including a seal surface abutting the platform.

In a further non-limiting embodiment of any of the foregoing examples, the body has a uniform through-thickness.

A turbine engine according to an exemplary aspect of the present disclosure includes, optionally a fan, a compressor section, a combustor in fluid communication with the compressor section, and a turbine section in fluid communication with the combustor. The turbine section is coupled to drive the compressor section and the fan. At least one of the fan, the compressor section and the turbine section includes an airfoil having a body including a platform, an airfoil extending outwardly from a side of the platform and a root extending outwardly from another side of the platform. A member is connected in an articulated joint to the body.

A method for processing an airfoil according to an exemplary aspect of the present disclosure includes depositing multiple layers of a powdered metal onto one another, joining the layers to one another with reference to data relating to a particular cross-section of an airfoil, and producing the airfoil with a body including a platform, an airfoil extending outwardly from a side of the platform and a root extending outwardly from another side of the platform, and a member connected in an articulated joint to the body.

A method for processing an airfoil according to an exemplary aspect of the present disclosure includes providing an airfoil that includes a body having a platform, an airfoil extending outwardly from a side of the platform and a root extending outwardly from another side of the platform, providing a damper member including a damper body and forming an articulated joint to connect the body and a damper member together such that the damper body extends adjacent the platform.

In a further non-limiting embodiment of any of the foregoing examples, the forming includes depositing multiple layers of a powdered metal onto one another and joining the layers to one another with reference to data relating to a particular cross-section of the articulated joint.

A further non-limiting embodiment of any of the foregoing examples includes destructively removing at least a portion of a prior articulated joint of the airfoil and, in place of the prior articulated joint, forming the articulated joint.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION OF THE PREFERRED EMBODIMENT

Figure 1:
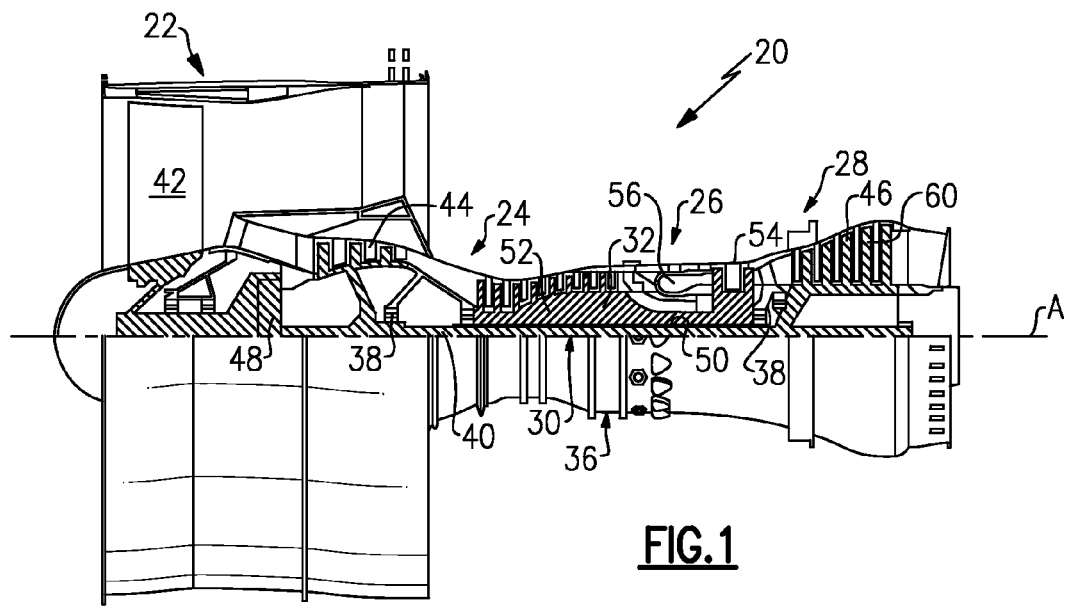
FIG. 1 shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 is connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

Figure 2:
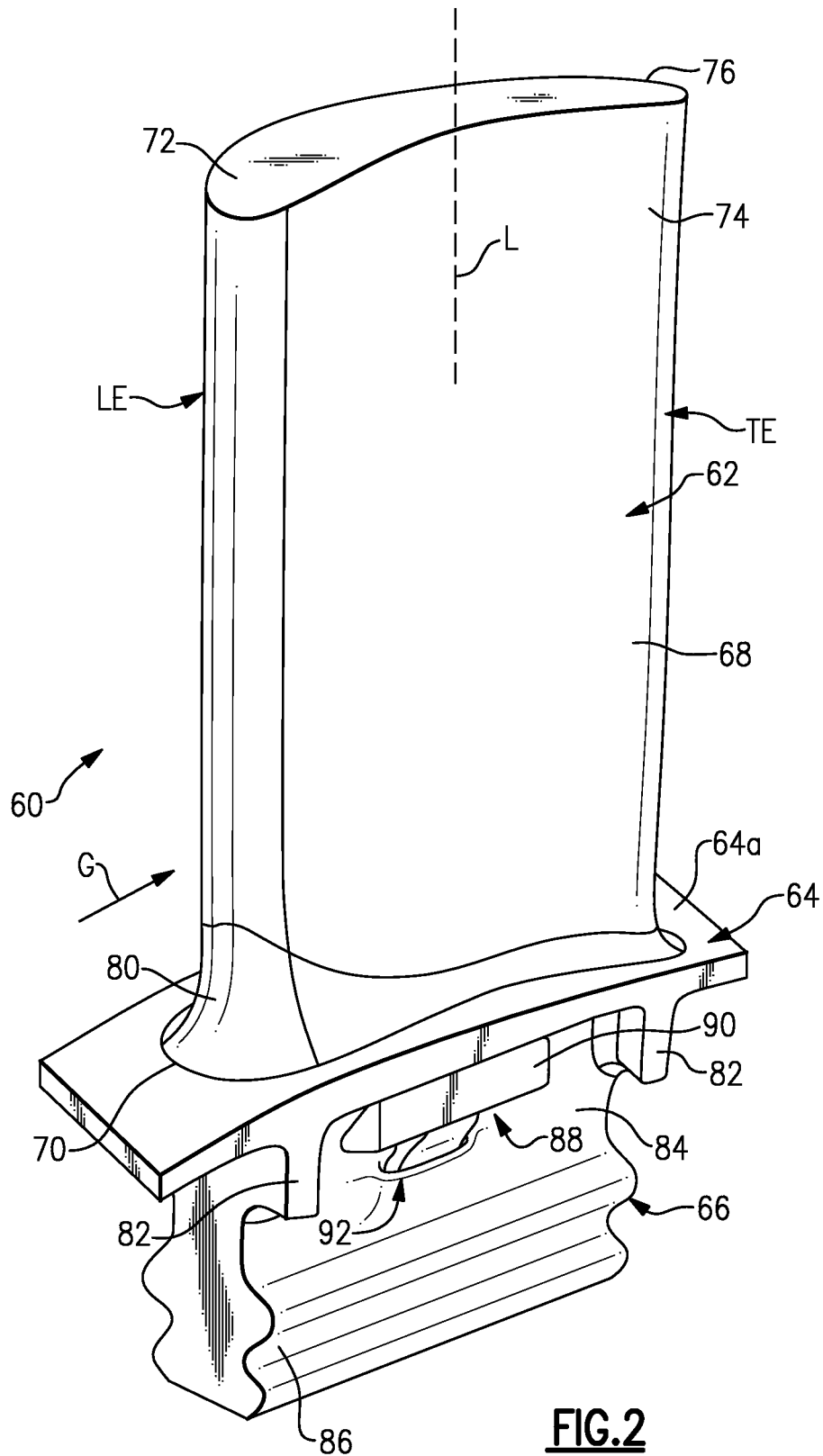
FIG. 2 shows a perspective view of an airfoil.

FIG. 2 illustrates an example airfoil 60. In this example, the airfoil 60 is a turbine blade of the turbine section 28. The airfoil 60 may be mounted on a turbine disk in a known manner with a plurality of like airfoils. Alternatively, it is to be understood that although the airfoil 60 is depicted as a turbine blade, the disclosure is not limited to turbine blades and the concepts disclosed herein are applicable to turbine vanes, compressor airfoils (blades or vanes) in the compressor section 24, fan airfoils in the fan section 22 or any other airfoil structures. Thus, some features that are particular to the illustrated turbine blade are to be considered optional.

The airfoil 60 includes an airfoil portion 62, a platform 64 and a root 66. The platform 64 and the root 66 are particular to the turbine blade and thus may differ in other airfoil structures or may be excluded in other airfoil structures.

The airfoil 60 includes a body 68 that defines a longitudinal axis L between a base 70 at the platform 64 and a tip end 72. The longitudinal axis L in this example is perpendicular to the engine central axis A. The body 68 includes a leading edge (LE) and a trailing edge (TE) and a first side wall 74 (pressure side) and a second side wall 76 (suction side) that is spaced apart from the first side wall 74. The first side wall 74 and the second side wall 76 join the leading edge (LE) and the trailing edge (TE).

The airfoil portion 62 connects to the platform 64 at a fillet 80. The platform 64 connects to the root 66 at buttresses 82. The root 66 generally includes a neck 84 and a serration portion 86 for securing the airfoil 60 in a disk.

It should be understood that relative positional terms such as "forward," "aft," "upper," "lower," "above," "below," "circumferential," "radial" and the like are with reference to the normal operational attitude and engine central axis A, unless otherwise indicated. Furthermore, with reference to the engine 20, the tip end 72 of the airfoil 60 is commonly referred to as the outer diameter of the airfoil 60 and the root 66 is commonly referred to as the inner diameter of the airfoil 60. The platform 64 includes an upper surface 64a that bounds an inner diameter of a gas path, generally shown as G, over the airfoil portion 62. Some airfoils may also include a platform at the tip end 72 that bounds an outer diameter of the gas path G.

Figure 3A:
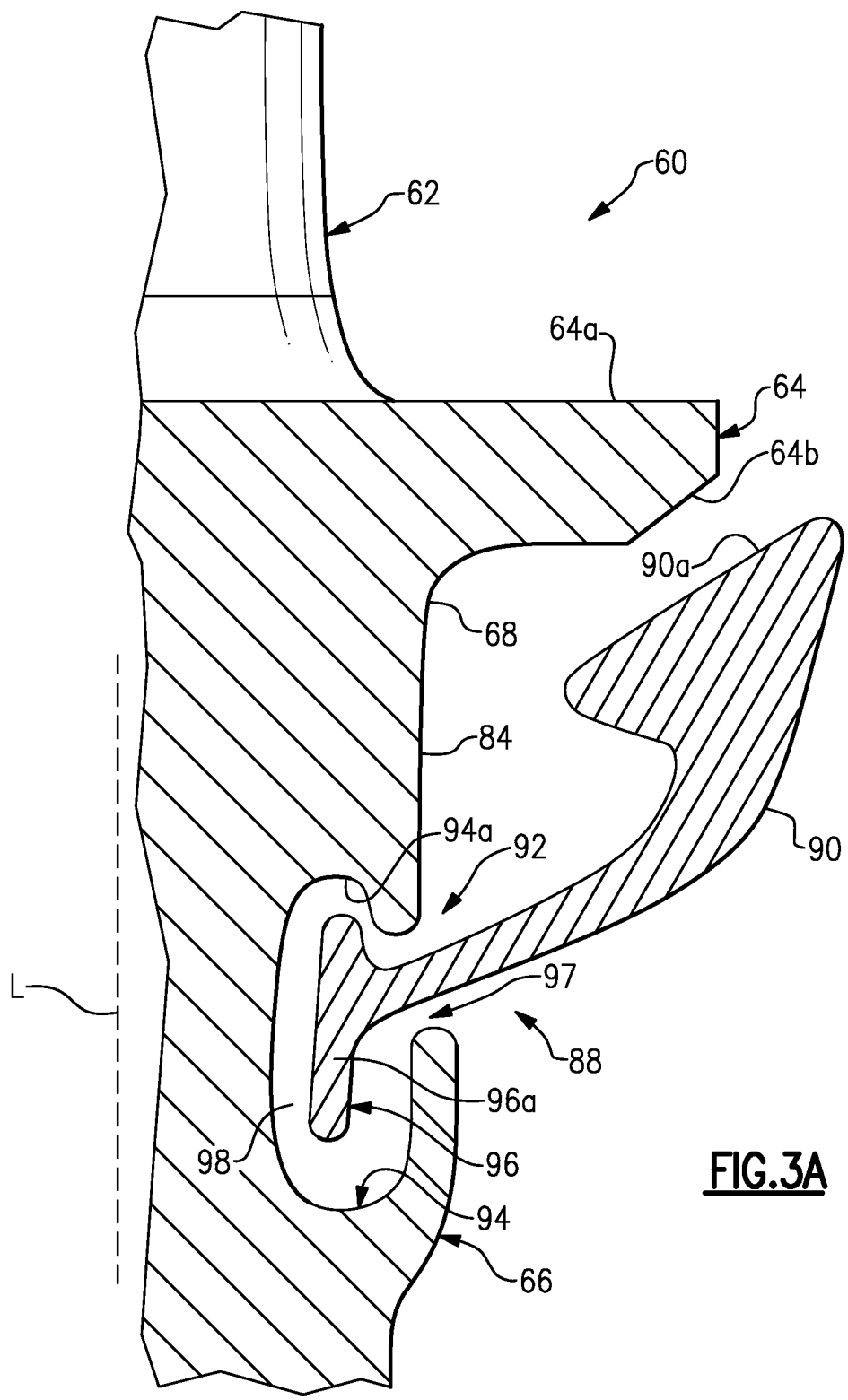
FIG. 3A shows a cross-section of an articulated joint of the airfoil.
Figure 3B:
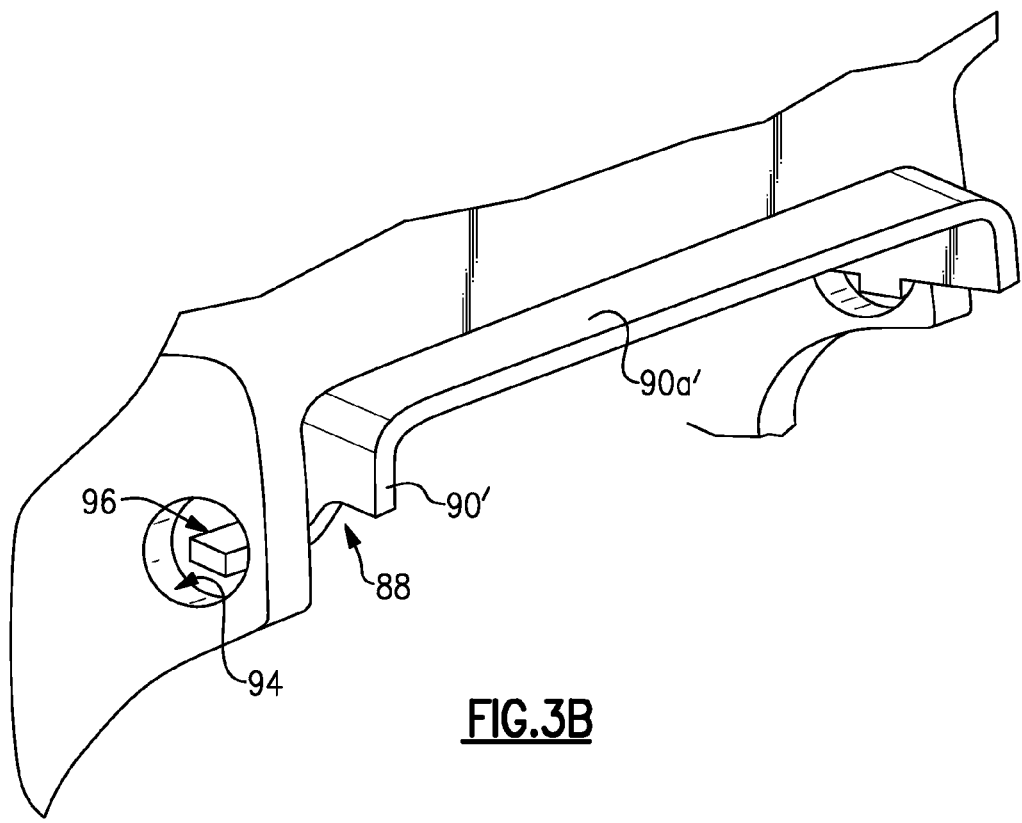
FIG. 3B shows a cross-section of another articulated joint of an airfoil seal of an airfoil.
Figure 3C:
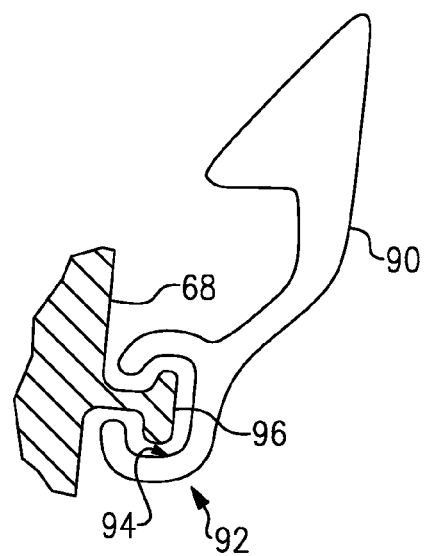
FIG. 3C shows a cross-section of another articulated joint of an airfoil.

Referring also to FIG. 3A, the airfoil 60 includes a member 88 mounted on the exterior thereof. The member 88 is a damper member in this example, but is not limited to damper members and may be, in one non-limiting example, a seal as shown in FIG. 3B. Thus, it is to be understood that although the member 88 may be described in the context of a damper member herein, the examples disclosed herein are not so limited and may benefit other airfoil structures.

In this example, the damper member 88 includes a damper body or finger 90 that extends from the body 68 to a location that is adjacent the platform 64. The damper member 88 is connected to the body 68 of the airfoil 60 in an articulated joint 92. The articulated joint 92 includes a socket 94 and a socket member 96 that is moveably interlocked with the socket 94. In this example, the socket 94 is fixed on the root 66 of the airfoil 60. However, the socket 94 can alternatively be located elsewhere on the exterior or interior of the airfoil 60. Additionally, although the socket 94 in this example is fixed on the body 68, it is to be understood that, alternatively, the socket member 96 could be fixed on the body 68 and the socket 94 connected to the damper body 90 to form the articulated joint 92, as shown in FIG. 3B.

The socket 94 defines socket sidewalls 94a, and the socket sidewalls 94a define an opening 97 through which the damper body 90 extends. The opening 97 is smaller than the socket member 96 such that the socket member 96 cannot fit through the opening 97.

Additionally, in this example, both the socket 94 and the socket member 96 are longitudinally elongated. Thus, the socket member 96 includes a longitudinally elongated portion 96a that extends within the socket 94. The longitudinally elongated portion 96a is longer in the longitudinal direction than the longitudinal length of the opening 97. Thus, the socket member 96 is irremovably interlocked in the socket 94. The socket member 96 is free-floating within the socket 94 such that there is an open gap 98 between the socket sidewalls 94a and the socket member 96. However, the socket member 96 cannot be non-destructively removed from the socket 94.

The damper body 90 extends upwardly from the articulated joint 92 to the location adjacent the platform 64. The damper body 90 includes an inclined bearing surface 90a. The inclined bearing surface 90a is inclined with respect to the longitudinal axis L of the body 68. As will be described in further detail below, the inclined bearing surface 90a interfaces with a corresponding bearing surface 64b of the platform 64.

In the example of the seal (FIG. 3B), the socket member 96 of the member 88 is a tab. The member 88 includes a body or finger 90' having a seal surface 90a'. The seal surface 90a' is approximately parallel to the underside of the platform 64 during engine operation such that the seal surface 90a' abuts the underside to seal a gap between the platform 64 and the platform of a neighboring airfoils. In this example, the body 90' has a uniform through-thickness and can be made of sheet metal or by the additive manufacturing process described below.

Figure 4:
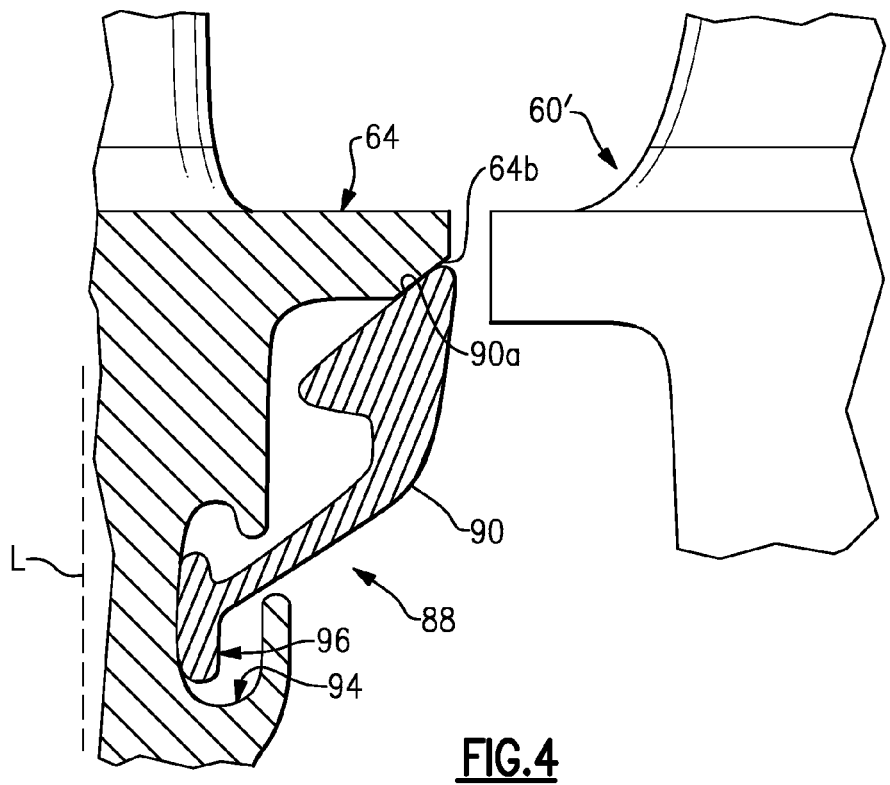
FIG. 4 shows a cross-section of the articulated joint in a static position.
Figure 5:
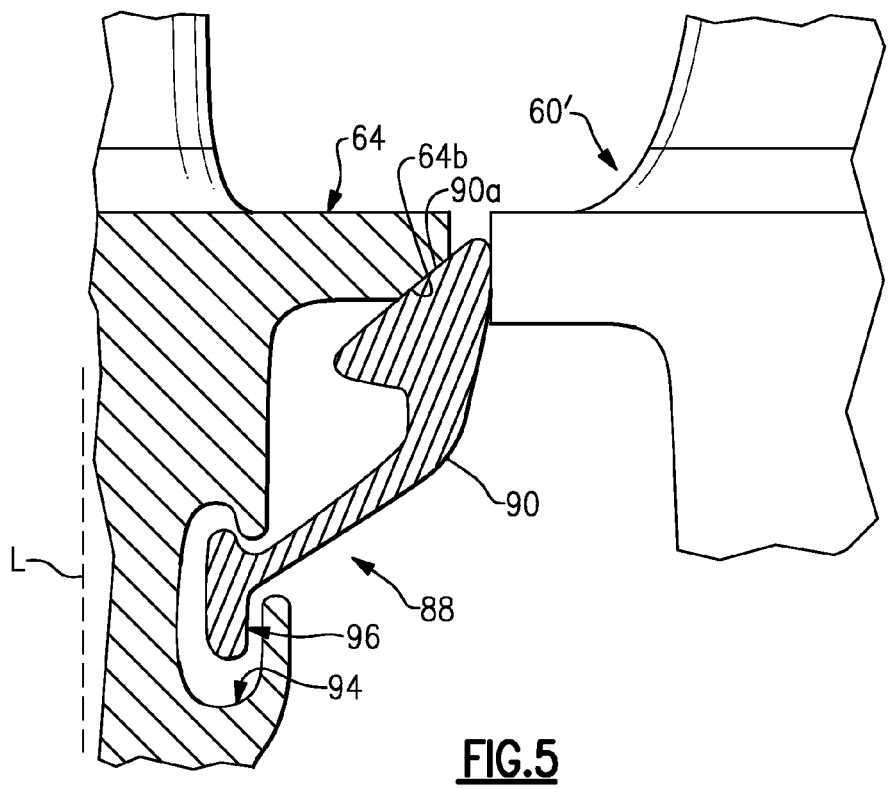
FIG. 5 shows a cross-section of the articulated joint in an operational condition.

Turning to the operation of the damper member 88, FIG. 3A shows the damper member 88 in an as-manufactured condition. FIG. 4 shows the damper member 88 in a static position as it might look during assembly of the engine 20. In the static position, the socket member 96 is moved generally downwardly within the socket 94. FIG. 5 shows the damper member 88 in an operational position as it might look during operation of the engine 20 when the airfoil rotates about the engine central axis A. Upon rotation of the airfoil 60, the socket member 96 and damper body 90 are thrown longitudinally outwardly such that the inclined bearing surface 90a of the damper body 90 contacts the bearing surface 64b of the platform 64. Friction between the inclined bearing surface 90a and the bearing surface 64b removes energy from the system and thus limit/dampen vibrational movement of the airfoil 60 relative to a neighboring airfoil 60'. In the example of the seal (FIG. 3B), the member 88 and body 90' are thrown longitudinally outwardly such that the seal surface 90a' abuts the underside of the platform 64.

Figure 6A:
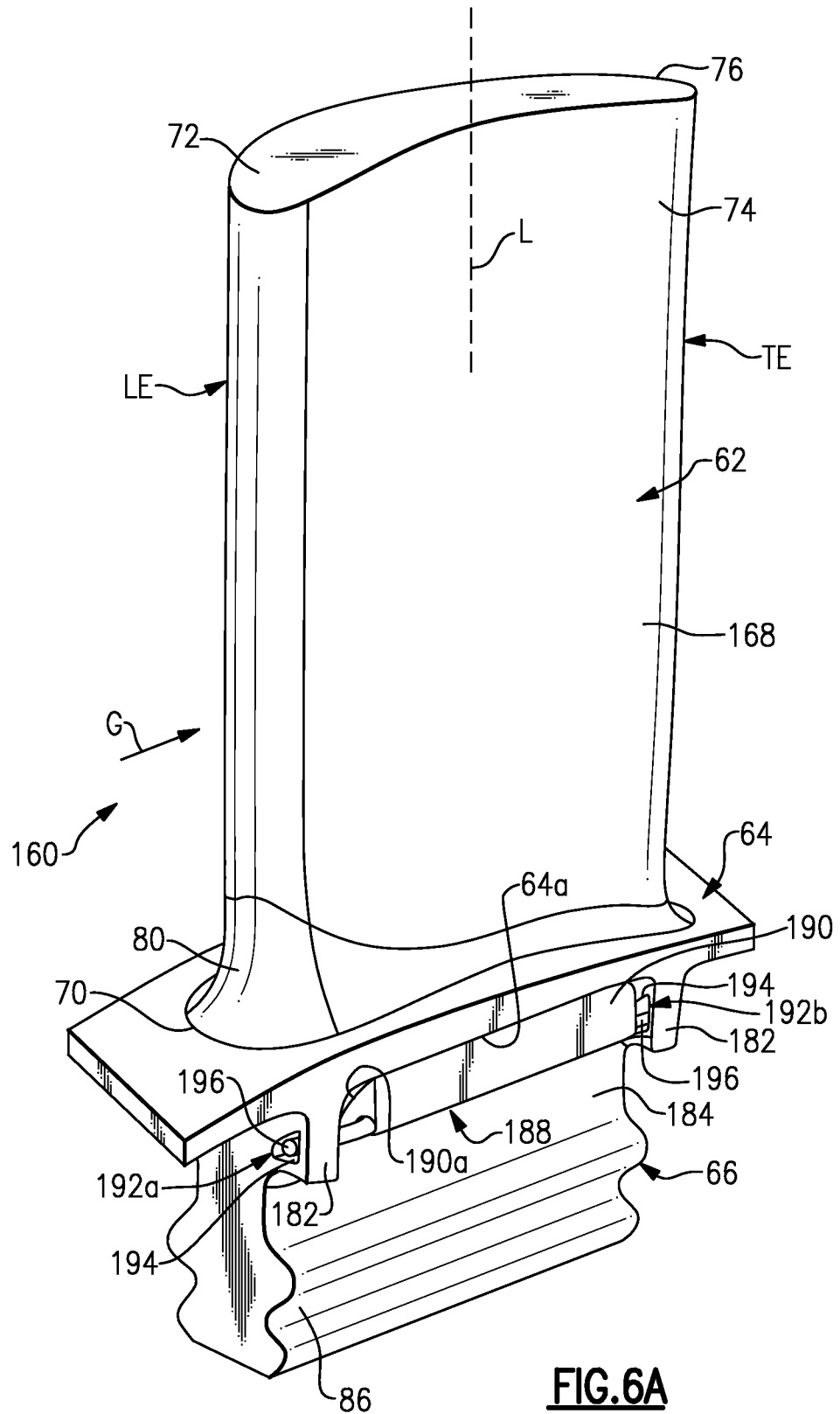
FIG. 6A shows a perspective view of another example airfoil having a damper member connected in an articulated joint.

FIG. 6A illustrates another example airfoil 160. In this disclosure, like reference numerals designate like elements where appropriate and reference numerals with the addition of one-hundred or multiples thereof designate modified elements that are understood to incorporate the same features and benefits of the corresponding elements. The airfoil 160 includes a damper member 188 having a damper body or finger 190 that extends from the body 168 to a location adjacent the platform 64.

In this example, the damper member 188 is connected in a first articulated joint 192a and a second articulated joint 192b to the body 168 of the airfoil 160. The buttresses 182 are spaced apart and each include a socket 194 and a socket member 196 that is movably interlocked with the socket 194 to form the respective articulated joints 192a and 192b. In this example, each of the socket members 196 are pins that extend generally laterally from the damper body 190 into the respective sockets 194. The socket members 196 are free to move within the respective sockets 194 but cannot be removed from the respective sockets 194 without destroying at least one or the other of the socket members 196. That is, the socket members 196 and damper body 190 are irremovably trapped between the buttresses 182.

In operation, the socket members 196 and damper body 190 are thrown longitudinally outwardly during operation of the airfoil, similar to as described above, such that the inclined bearing surface 190a of the damper body 190 contacts the corresponding bearing surface 64a to dampen vibrational modes of the airfoil 160.

Figure 6C:
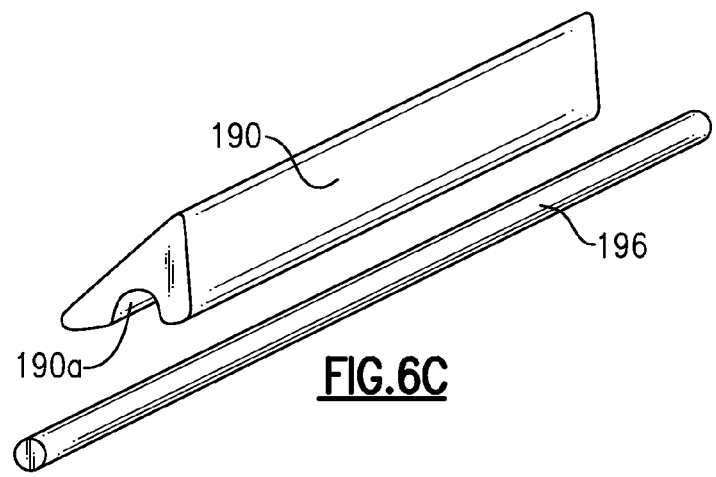
FIG. 6C shows the damper member of FIG. 6B prior to assembly.
Figure 6B:
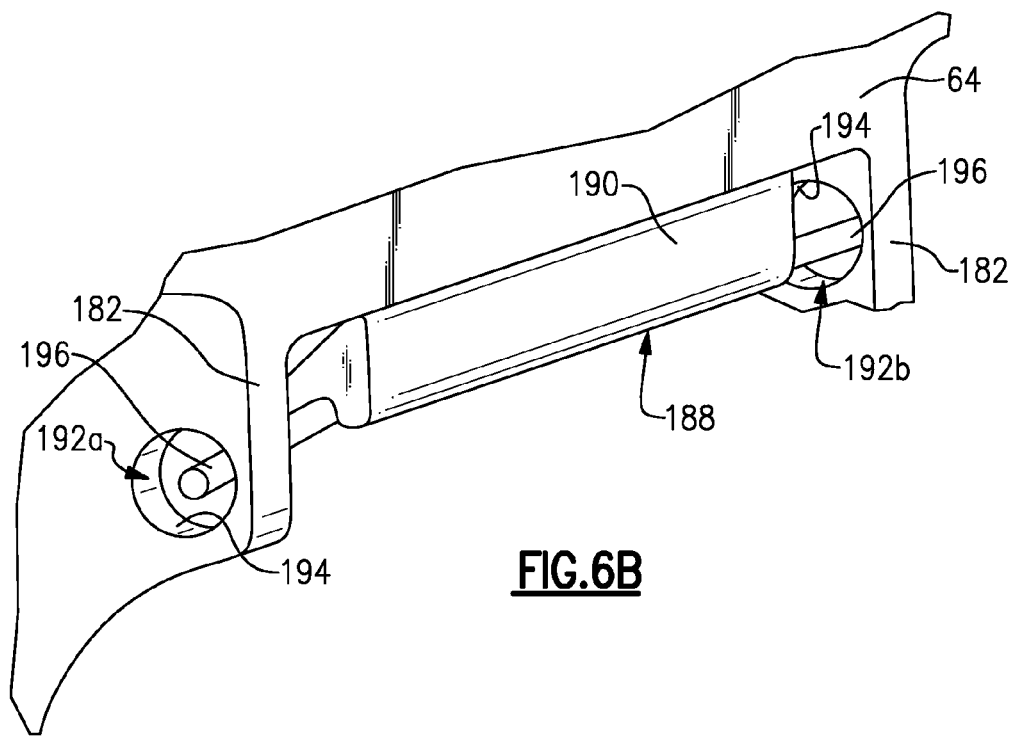
FIG. 6B shows a perspective view of a modified version of the damper member of FIG. 6A.

FIGS. 6B and 6C illustrate a modification of the damper member 188. In FIG. 6A, the socket members 196 are integral with the damper body 190 such that the damper body is a monolithic piece. However, in FIGS. 6B and 6C, the socket member 196 is a rod that is initially separate from the damper body 190 to assist in assembling the damper member 188. For example, the damper body 188 is located between the buttresses 182 and the socket member 196 slides through the sockets 194 and a groove 190a in the damper body 190. The socket member 196 is then welded or otherwise bonded to the damper body 188 such that the socket member 196 that is movably interlocked with the socket 194 to form the respective articulated joints 192a and 192b. Furthermore, although a wedge-type of damper body 190 is shown in this example, it is to be understood that the example will also benefit other structures or damper designs.

Figure 7A:
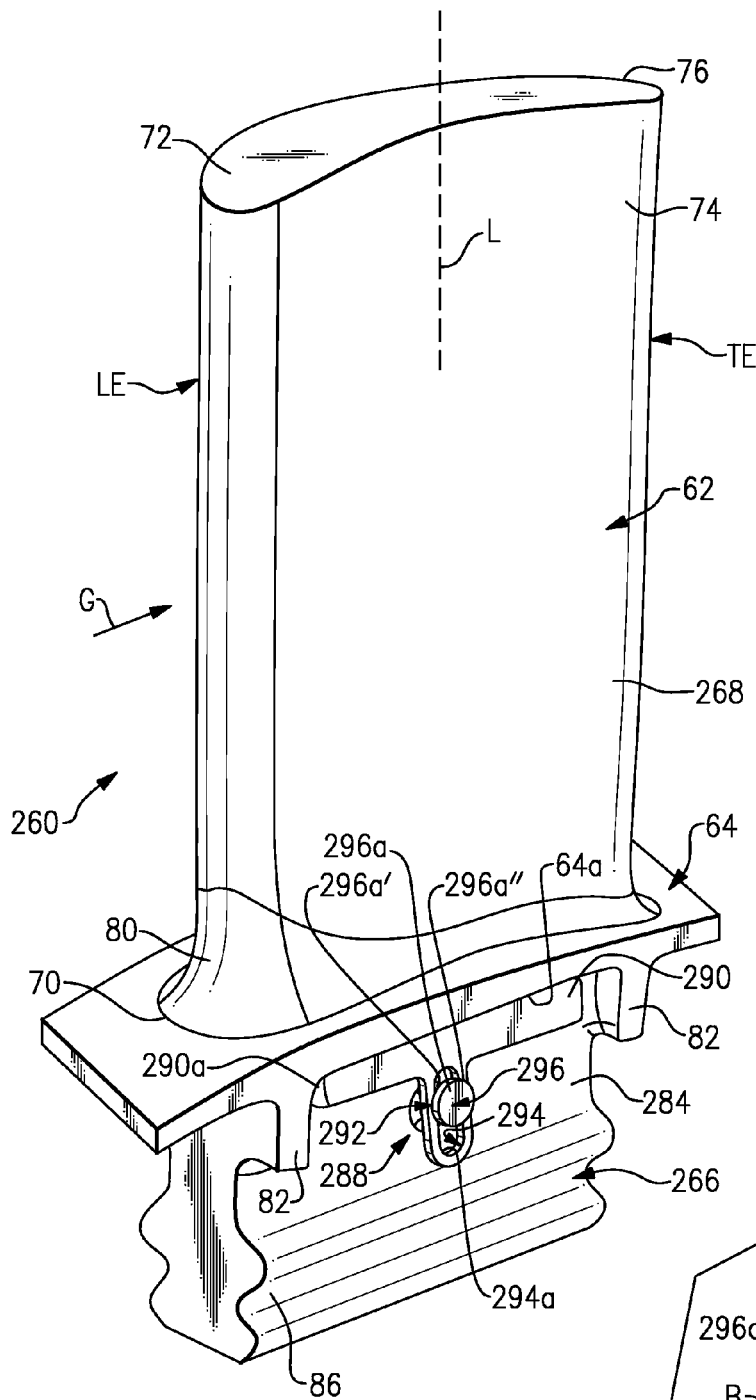
FIG. 7A shows a perspective view of another example airfoil having a damper member connected in an articulated joint.

FIG. 7A shows another modified airfoil 260 that includes a damper member 288 having a damper body or finger 290 that extends to a location adjacent the platform 64, similar to as described above. In this example, the damper member 288 is connected in an articulated joint 292 to the body 268 of the airfoil 260. As shown, the articulated joint 292 includes a socket 294 and a socket member 296 that is moveably interlocked with the socket 294.

In this example, the socket 294 is a slot 294a and the socket member 296 is a button 296a. The button 296a includes a shank 296a' and an enlarged head 296a" on the shank 296a'. The shank 296a' is fixed to the neck 284 of the airfoil 260. Thus, the enlarged head 296a" interlocks the button 296a with the slot 294a. In this example, the socket 294 is connected to the damper body 290 such that the damper body 290 and the socket 294 can translate longitudinally relative to the button 296a. It is to be understood that the button 296a could alternatively be fixed to the damper body 290 and the socket 294 fixed to the neck 284.

In operation, upon rotation of the airfoil 260, the damper body 290 is thrown longitudinally outwardly such that the inclined bearing surface 290a contacts the corresponding bear surface 64a of the platform 64 to dampen vibrational modes of the airfoil 260.

Figure 8:
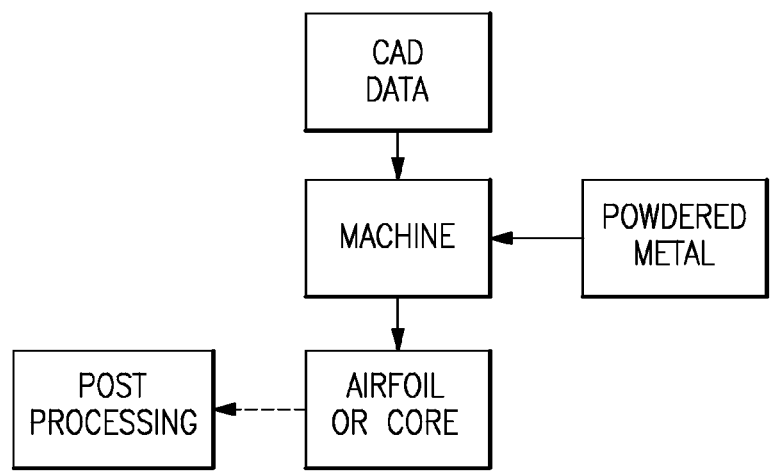
FIG. 8 shows a method for processing an airfoil.

The geometries disclosed herein may be difficult to form using conventional casting technologies. Thus, a method of processing an airfoil having the features disclosed herein includes an additive manufacturing process, as schematically illustrated in FIG. 8. Powdered metal suitable for aerospace airfoil applications is fed to a machine, which may provide a vacuum, for example. The machine deposits multiple layers of powdered metal onto one another. The layers are selectively joined to one another with reference to Computer-Aided Design data to form solid structures that relate to a particular cross-section of the airfoil. In one example, the powdered metal is selectively melted using a direct metal laser sintering process or an electron-beam melting process. Other layers or portions of layers corresponding to negative features, such as cavities or openings, are not joined and thus remain as a powdered metal. The unjoined powder metal may later be removed using blown air, for example. With the layers built upon one another and joined to one another cross-section by cross-section, an airfoil or portion thereof, such as for a repair, with any or all of the above-described geometries, may be produced. The airfoil may be post-processed to provide desired structural characteristics. For example, the airfoil may be heated to reconfigure the joined layers into a single crystalline structure.

Additionally, any of the articulated joints 92, 192a, 192b, 292 disclosed herein can be formed as a retrofit or repair of an existing airfoil. In a retrofit, an existing airfoil would be suitably prepared by milling or machining the surfaces and using the method above to build the respective articulated joint 92, 192a, 192b, 292. Alternatively, in a repair, an existing articulated joint may be removed or partially removed and then rebuilt using the method. For example, in the articulated joint 92, the socket member 96 and damper body 90 may be destroyed to thereby remove the socket member 96 from the socket 94. A new socket member 96 and/or damper body 90 may then be rebuilt within the socket 94 using the method. Similarly, the socket members 196 and 296 may be fully or partially removed/destroyed and fully or partially rebuilt using the method in a repair procedure.

Figure 7B:
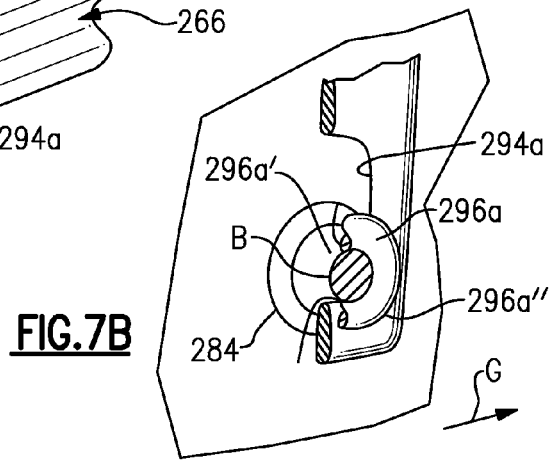
FIG. 7B shows a cutaway view of the articulated joint shown in FIG. 7A.

In one alternative method of processing, the articulated joint 292 shown in FIG. 7A is repaired without an additive manufacturing process. Referring to FIG. 7B, the button 296a can be fully or partially formed as a separate piece such that the shank 296a' is received through the socket 294a and then welded or bonded to the neck 284 at bond interface B. To assist with the bonding, the neck 284 can be provided with a pre-existing nub or projection, which may be a cast feature.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An airfoil comprising:
   a body including a platform, an airfoil extending outwardly from a side of the platform and a root extending outwardly from another side of the platform, the body having one of a socket or a socket member that are connected together in an articulated joint; and
   a member including the other of the socket member or the socket, the socket member irremovably interlocked with the socket such that the socket member cannot be removed from the socket non-destructively.

2. The airfoil as recited in claim 1, wherein the member includes a body extending adjacent the platform.

3. The airfoil as recited in claim 1, wherein the socket is fixed on the root.

4. The airfoil as recited in claim 1, wherein the body defines a longitudinal axis and the socket is longitudinally elongated relative to the longitudinal axis.

5. The airfoil as recited in claim 1, wherein the body defines a longitudinal axis and the socket member is longitudinally elongated relative to the longitudinal axis.

6. The airfoil as recited in claim 1, wherein the member is a damper member including a damper body extending adjacent the platform.

7. The airfoil as recited in claim 1, wherein the member is a damper member including a damper body extending adjacent the platform, and the body defines a longitudinal axis and the damper body of the damper member includes an inclined bearing surface relative to the longitudinal axis.

8. The airfoil as recited in claim 1, further including a first buttress wall extending outwardly from the platform to the root and a second buttress wall extending outwardly from the platform to the root, the first buttress wall being spaced apart from the second buttress wall and the member being connected in a first articulated joint to the first buttress wall and in a second articulated joint to the second buttress wall.

9. The airfoil as recited in claim 1, wherein the member includes a body extending adjacent the platform, the body including a seal surface abutting the platform.

10. The airfoil as recited in claim 9, wherein the body has a uniform through-thickness.

11. The airfoil as recited in claim 1, wherein the member is a damper member including a damper body extending upwardly from the articulated joint toward the platform.

12. The airfoil as recited in claim 1, wherein the damper body includes an end opposed from the articulated joint, the end including an inclined bearing surface interfacing a corresponding bearing surface of the platform.

13. The airfoil as recited in claim 1, wherein the body defines a longitudinal axis and the socket member includes an enlarged head that is elongated relative to the longitudinal axis.

14. The airfoil as recited in claim 1, wherein the one of the socket or the socket member of the body is exclusively formed in the root.

15. An airfoil comprising:
   a body including a platform, an airfoil extending outwardly from a side of the platform and a root extending outwardly from another side of the platform; and
   a member connected in an articulated joint to the body, the articulated joint including a socket and a socket member movably interlocked with the socket, wherein the socket is a slot and the socket member is a button having a shank and enlarged head on the shank.

16. A turbine engine comprising:
   optionally, a fan;
   a compressor section;
   a combustor in fluid communication with the compressor section; and
   a turbine section in fluid communication with the combustor, the turbine section being coupled to drive the compressor section and the fan, and
   at least one of the fan, the compressor section and the turbine section including an airfoil having a body including a platform, an airfoil extending outwardly from a side of the platform and a root extending outwardly from another side of the platform, and a member connected in an articulated joint to the body, the articulated joint including a socket and a socket member movably interlocked with the socket, wherein the socket is a slot and the socket member is a button having a shank and enlarged head on the shank.

17. A method for processing an airfoil, the method comprising:
   depositing multiple layers of a powdered metal onto one another;

joining the layers to one another with reference to data relating to a particular cross-section of an airfoil; and producing the airfoil with a body including a platform, an airfoil extending outwardly from a side of the platform and a root extending outwardly from another side of the platform, and a member connected in an articulated joint to the body, wherein the body has one of a socket or a socket member that are connected together in the articulated joint, and the member includes the other of the socket member or the socket, the socket member irremovably interlocked with the socket such that the socket member cannot be removed from the socket non-destructively.

18. The method as recited in claim 17, wherein the articulated joint includes a socket and a socket member movably interlocked with the socket, and the socket is a slot and the socket member is a button having a shank and enlarged head on the shank.

19. A method for processing an airfoil, the method comprising:

providing an airfoil that includes a body having a platform, an airfoil extending outwardly from a side of the platform and a root extending outwardly from another side of the platform;

providing a damper member including a damper body; and forming an articulated joint to connect the body and a damper member together such that the damper body extends adjacent the platform, the articulated joint including a socket and a socket member movably interlocked with the socket, wherein the socket is a slot and the socket member is a button having a shank and enlarged head on the shank.

20. The method as recited in claim 19, wherein the forming includes depositing multiple layers of a powdered metal onto one another and joining the layers to one another with reference to data relating to a particular cross-section of the articulated joint.

21. The method as recited in claim 19, further including destructively removing at least a portion of a prior articulated joint of the airfoil and, in place of the prior articulated joint, forming the articulated joint.

* * * * *